United States Patent Office 3,245,752
Patented Apr. 12, 1966

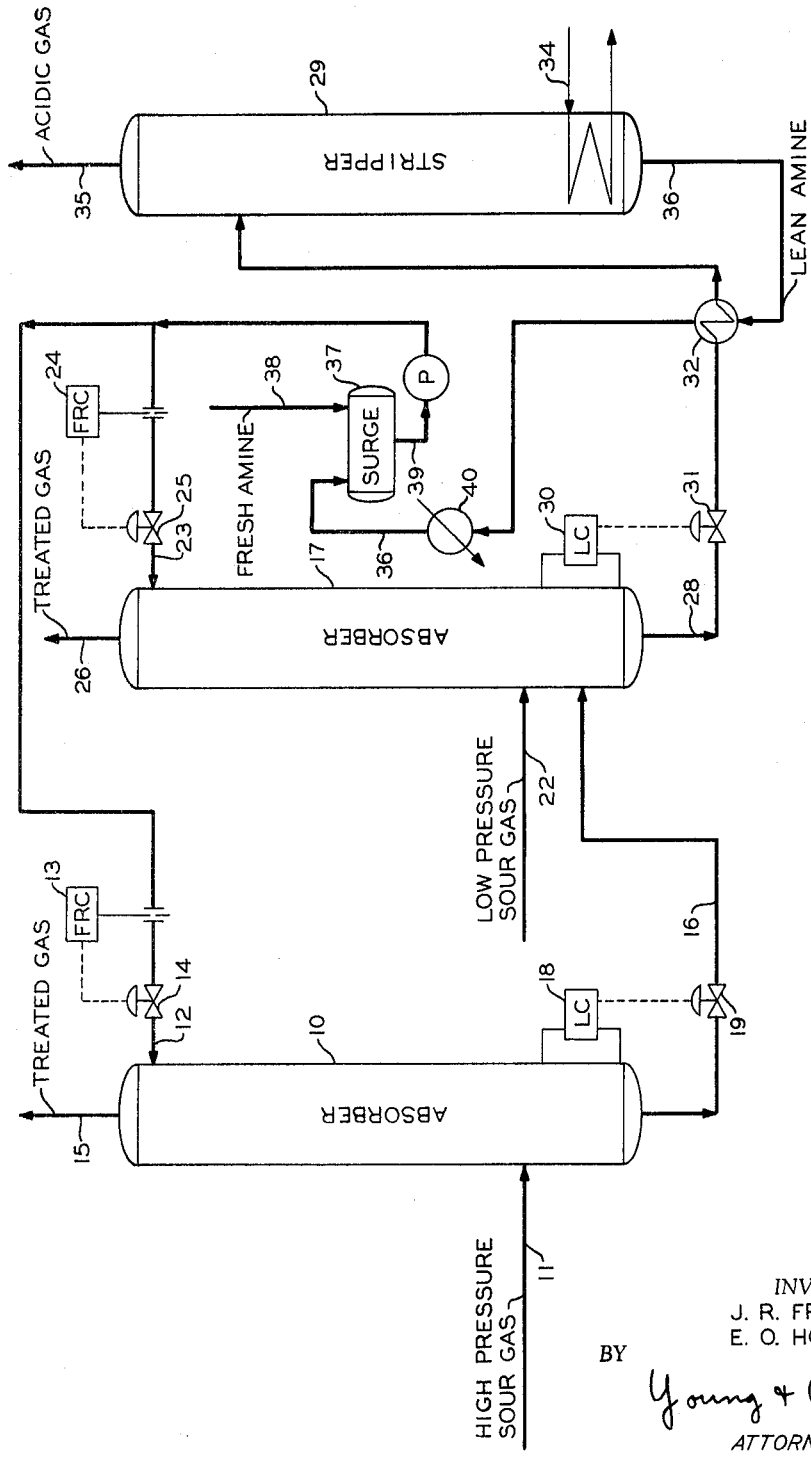

3,245,752
TREATMENT OF GASEOUS STREAMS AT DIFFERENT PRESSURES TO REMOVE ACIDIC CONSTITUENTS
Jack R. Fryar and Eric O. Holland, Bartlesville, Okla., assignors to Phillips Petroleum Company, a corporation of Delaware
Filed Mar. 5, 1962, Ser. No. 177,652
6 Claims. (Cl. 23—2)

This invention relates to the removal of acidic constituents from gaseous streams.

It is well known in the art to remove acidic constituents such as hydrogen sulfide and carbon dioxide from gaseous streams by the use of materials which selectively absorb these acidic constituents. For example, sour gaseous hydrocarbon streams can be contacted with monoethanolamine to remove hydrogen sulfide and carbon dioxide. The resulting rich absorbent can then be heated to remove the absorbed constituents, and the lean absorbent can be reused. In many operations, it is desirable to treat two gaseous streams which exist at substantially different pressures. When a hydrocarbon gaseous stream is contacted with an amine at relatively high pressures, some hydrocarbons are absorbed along with the acidic constituents. If the resulting rich amine stream is passed directly to a stripper, these absorbed hydrocarbons are flashed with the acidic constituents which are normally vented to a flare. This can result in the loss of valuable hydrocarbons from the system. As an alternative, the rich absorbent can be passed to a low pressure flash tank for the recovery of these hydrocarbons. However, this latter procedure requires the installation of an additional tank which increases the expense of the system.

In accordance with the present invention, a novel method is provided for the treatment of two gaseous streams which exist at different pressures to remove acidic constituents therefrom. The high pressure gaseous stream is first contacted with an absorbent for the acidic constituents so as to remove these constituents from the first gaseous stream. The second gaseous stream at the lower pressure is contacted with a portion of the same absorbent in a second contacting zone. The rich absorbent from the first contacting zone is also introduced into the second contacting zone so that any desirable gaseous constituents which have been absorbed in the high pressure zone are flashed in the lower pressure zone and recovered. The resulting rich absorbent from the lower pressure contacting zone is then passed to a regeneration zone wherein the absorbed acidic constituents are removed. The regenerated absorbent is returned from the regeneration zone to the two contacting zones. In this manner, two gaseous streams at different pressures are treated without the loss of valuable constituents therefrom.

Accordingly, it is an object of this invention to provide an improved method of removing acidic constituents from two gaseous streams which exist at different pressures.

Another object is to provide an efficient procedure for removing acidic constituents from high pressure gaseous hydrocarbon streams without the loss of valuable hydrocarbons.

A further object is to provide apparatus for use in treating gaseous streams to remove acidic constituents.

Other objects, advantages and features of the invention should become apparent from the following detailed description, taken in conjunction with the accompanying drawing which is a schematic representation of apparatus employed to carry out the method of this invention.

Referring now to the drawing in detail, there is shown a first absorber 10. A gaseous stream containing acidic constituents such as hydrogen sulfide and carbon dioxide is introduced into the lower region of absorber 10 through a conduit 11 from a source, not shown, at a relatively constant rate. This gaseous stream is introduced at relatively high pressure, such as 150 to 1200 pounds per square inch absolute (p.s.i.a.). A material which selectively absorbs the acidic constituents is introduced into the upper region of absorber 10 through conduit 12. A suitable absorbent for this purpose is monoethanolamine. Other suitable absorbents include diethanolamine, potassium phosphate, and a mixture of diethylene glycol and monethanolamine, for example. This absorbent is introduced at a predetemined rate which is maintained by a flow controller 13 which adjusts a valve 14 in conduit 12. The absorbent removes the acidic constituents from the gaseous stream so that the gases removed from absorber 10 through a conduit 15 are substantially free of hydrogen sulfide and carbon dioxide. The resulting rich absorbent is removed from the bottom of absorber 10 through a conduit 16 which communicates with the lower region of a second absorber 17. The flow through conduit 16 is adjusted by a level controller 18 which regulates a valve 19 so as to maintain a predetermined liquid level of rich absorbent in the lower region of absorber 10.

A second gaseous stream to be treated is introduced into the lower region of absorber 17 through a conduit 22 from a source, not shown, at a relatively constant rate. This gaseous stream is at a substantially lower pressure than is the stream introduced into absorber 10. For example, the pressure of the gaseous stream introduced through conduit 22 can be in the range of 30 to 100 p.s.i.a. An additional amount of absorbent is introduced into the upper region of absorber 17 through a conduit 23. The rate of flow of absorbent through conduit 23 is regulated by a flow controller 24 which adjusts a valve 25. The rich absorbent from absorber 10 is reduced in pressure in passing through valve 19 so that any hydrocarbons absorbed in vessel 10 are flashed from the absorbent in vessel 17. A gas stream substantially free of hydrogen sulfide and carbon dioxide is removed from the top of absorber 17 through a conduit 26.

The rich absorbent is removed from absorber 17 through a conduit 28 which communicates with a stripper 29. The flow of rich absorbent through conduit 28 is regulated by a liquid level controller 30 which adjusts a valve 31 to maintain a predetermined liquid level of rich absorbent in the lower region of absorber 17. A heat exchanger 32 is disposed in conduit 28. Steam, or other heating medium, is supplied to the lower region of stripped 29 by means of conduit 34. The heat supplied to the stripper results in desorption of the acidic constituents which are removed from the top of the stripper through a conduit 35. The resulting lean absorbent is removed from the bottom of stripper 29 through a conduit 36 which communicates with a surge tank 37. Conduit 36 communicates with heat exchanger 32 and has a cooler 40 disposed therein to provide additional cooling. Fresh absorbent is supplied to tank 37 through a conduit 38, as needed. The resulting lean absorbent is removed from surge tank 37 through a conduit 39 which has a pump 41 therein. Conduit 39 communicates with conduits 12 and 23 to supply lean absorbent to vessels 10 and 17. Stripper 29 is shown schematically. In actual practice, the overhead gases usually pass through a condenser to an accumulator. The acidic gases are removed from the top of the accumulator, and condensate is returned to the stripper as reflux.

As a specific example of the operation of this invention, a high pressure natural gas stream is introduced into absorber 10 at a rate of approximately 2,000,000 standard cubic feet per day. This gas stream contains approximately 1.5 mole percent acidic gases comprising approximately 1.1 mole percent hydrogen sulfide and approximately 0.4 mole percent carbon dioxide. Stream 11 is introduced into absorber 10 at a pressure of approximately 175 pounds per square inch gauge (p.s.i.g.). A 20 percent by weight aqueous solution of monoethanolamine at approximately 85° F. is introduced into absorber 10 through conduit 12 at a rate in the range of 4 to 8 gallons per minute. A residue hydrocarbon gas stream at a pressure of approximately 49 p.s.i.g. is introduced into absorber 17 through conduit 22. This residue gas stream contains approximately 80 grains of hydrogen sulfide per 100 cubic feet of gas. Carbon dioxide is present in a concentration of approximately 0.58 mole percent. The same monoethanolamine solution is introduced into absorber 17 at a rate of 10 to 14 gallons per minute. The treated gases removed through conduits 15 and 26 contain less than one-fourth grain of hydrogen sulfide per 100 cubic feet of gas.

An important feature of this invention resides in the introduction of rich absorbent from the high pressure contacting zone into the lower pressure contacting zone. The desired gaseous constituents which may be absorbed in the high pressure zone are flashed in the low pressure zone and recovered with the treated gas from this zone. This permits the recovery of valuable hydrocarbons which would otherwise be lost. This recovery is possible because some hydrocarbons are absorbed by the amine in absorber 10. However, the lower pressure in absorber 17 releases these hydrocarbons. The acidic constituents, on the other hand, require heat for their release in stripper 29.

While the invention has been described in conjunction with a presently preferred embodiment, it should be evident that it is not limited thereto.

What is claimed is:

1. A process for removing acidic gases from first and second gaseous streams at different pressures which comprises contacting the higher pressure gaseous stream in a first contacting zone with a liquid material capable of absorbing acidic gases from said higher pressure gaseous stream, reducing the pressure on the resulting material containing absorbed acidic gases and passing such material to a second contacting zone which is maintained at a lower pressure than said first contacting zone, passing the lower pressure gaseous stream into said second zone and contacting same therein with an additional amount of said material, withdrawing the material containing absorbed acidic gases from said second zone, removing absorbed acidic gases from said material withdrawn from said second zone, and returning the resulting material having acidic gases removed therefrom to said first and second zones to form at least a part of the absorbing material employed therein.

2. The process of claim 1 wherein said gaseous streams comprise hydrocarbon streams containing acidic gases of the group consisting of hydrogen sulfide and carbon dioxide, and wherein said material comprises an aqueous amine solution.

3. The process of claim 2 wherein said amine is monoethanolamine.

4. A process for removing hydrogen sulfide and carbon dioxide from first and second gaseous hydrocarbon streams which comprises passing the first gaseous stream which is at the higher pressure into a first contacting zone, passing a first stream of a liquid material which is capable of absorbing hydrogen sulfide and carbon dioxide into said first zone to contact said first gaseous stream, removing as a product from said first zone a gaseous hydrocarbon stream having a lower content of hydrogen sulfide and carbon dioxide than does said first gaseous stream, passing a stream of said material containing absorbed hydrogen sulfide and carbon dioxide from said first zone, reducing the pressure on said stream of material containing absorbed hydrogen sulfide and carbon dioxide and passing such stream to a second contacting zone which is maintained at a lower pressure than said first zone, passing said second gaseous stream into said second zone, passing a second stream of said material into said second zone to contact said second gaseous stream, removing as a product from said second zone a gaseous hydrocarbon stream having a lower content of hydrogen sulfide and carbon dioxide than does said second gaseous stream, passing a stream of said material containing absorbed hydrogen sulfide and carbon dioxide from said second zone to a stripping zone, heating said material in said stripping zone to remove hydrogen sulfide and carbon dioxide therefrom, and returning the resulting stripped material from said stripping zone to said first and second zones to form at least a part of said material passed to said first and second zones.

5. The process of claim 4 wherein said material comprises an aqueous solution of monoethanolamine.

6. The process of claim 4 wherein said material returned to said first and second zones is passed in heat exchange relationship with said stream of said material which is passed to said stripping zone.

References Cited by the Examiner

UNITED STATES PATENTS

| | | | |
|---|---|---|---|
| 2,437,288 | 3/1948 | Anderson | 208—289 |
| 2,477,314 | 7/1949 | Scharmann | 23—2 |
| 2,572,583 | 10/1951 | Antle | 208—289 |
| 2,616,513 | 11/1952 | McClendon | 208—289 |
| 2,860,030 | 11/1958 | Goldtrap et al. | 23—3 |

MAURICE A. BRINDISI, *Primary Examiner.*

ALPHONSO D. SULLIVAN, *Examiner.*